United States Patent

Bass et al.

[11] Patent Number: 6,057,376
[45] Date of Patent: May 2, 2000

[54] PROCESS TO PREPARE LOW DENSITY POROUS CROSSLINKED POLYMERIC MATERIALS

[75] Inventors: Ronald Marshall Bass; Thomas Fairchild Brownscombe, both of Houston, Tex.

[73] Assignee: Shell Oil Company, Houston, Tex.

[21] Appl. No.: 08/875,185

[22] PCT Filed: May 27, 1997

[86] PCT No.: PCT/US97/09011

§ 371 Date: Jul. 21, 1997

§ 102(e) Date: Jul. 21, 1997

[87] PCT Pub. No.: WO97/45479

PCT Pub. Date: Dec. 4, 1997

Related U.S. Application Data

[60] Provisional application No. 60/018,683, May 30, 1996.

[51] Int. Cl.[7] .................................................... C08J 9/28
[52] U.S. Cl. ................. 521/64; 521/56; 521/61; 521/62; 521/63; 521/107; 521/121; 521/128; 521/130; 521/142; 521/149; 521/150; 524/801; 524/804
[58] Field of Search .................................. 521/64, 56, 61, 521/62, 63, 142, 150, 149, 107, 121, 128, 130; 524/801, 804

[56] References Cited

U.S. PATENT DOCUMENTS

| | | | |
|---|---|---|---|
| 4,522,953 | 6/1985 | Barby et al. | 521/64 |
| 5,189,070 | 2/1993 | Brownscombe et al. | 521/64 |
| 5,200,433 | 4/1993 | Beshouri | 521/64 |
| 5,210,104 | 5/1993 | Bass et al. | 521/64 |
| 5,252,619 | 10/1993 | Brownscombe et al. | 521/64 |
| 5,290,820 | 3/1994 | Brownscombe et al. | 521/64 |

FOREIGN PATENT DOCUMENTS 4016-194   1/1992   Japan .

*Primary Examiner*—John M. Cooney, Jr.

[57] ABSTRACT

Stable high internal phase water-in-oil emulsions containing polymerizable vinyl monomers, crosslinking monomers and initiators are obtained, useful in producing low density porous crosslinked polymeric materials by using a surfactant system containing (a) an anionic surfactant, the anionic surfactant having an oil soluble tail and an anionic functional group and (b) one or more quaternary salts having one or more hydrocarbon groups having greater than or equal to 8 carbon atoms. A water-in-oil emulsion can be formed with lower surfactant concentration than sorbitan fatty acid ester alone and improved surfactant performance at elevated temperatures is obtained.

23 Claims, No Drawings

6,057,376

PROCESS TO PREPARE LOW DENSITY POROUS CROSSLINKED POLYMERIC MATERIALS

This application is a 371 of PCT/US97/09011, filed May 27, 1997. This application claims benefit of Provisional Application Ser. No. 60/018,683, filed May 30, 1996.

TECHNICAL FIELD

This invention relates to a process to prepare low density, porous, crosslinked, polymeric materials. In one aspect, the invention relates to improved surfactant systems for a high internal phase emulsion polymerization process to manufacture low density porous crosslinked polymeric materials.

BACKGROUND ART

Polymeric foams can be generally classified as either closed-cell foams or as open-cell foams. Open-cell foams can be used as a matrix to contain various liquids and gases. They are capable of various industrial applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase.

Such high absorption capacity, low density foams are prepared in U.S. Pat. No. 4,522,953 by polymerizing and crosslinking the monomers in the continuous oil phase of a high internal phase water-in-oil emulsion with a polymerization initiator such as potassium persulfate. Generally, these high internal phase water-in-oil emulsions contain at least 90 weight percent of an aqueous liquid as the internal phase. The high ratio water-in-oil emulsions are formed by combining the oil phase with water under moderate shear. In order to obtain this high internal phase water-in-oil emulsion, a surfactant must be used to stabilize the emulsion.

One class of surfactants used to produce foams by such processes are sorbitan fatty acid esters. Commercial sorbitan fatty acid esters are a combination of mono-, di-, tri-, and tetra-fatty acid esters of sorbitan $C_6(H_2O)_5H_2$, as well as mono- and di-fatty acid esters of isosorbide $C_6(H_2O)_4H_2$ and polyol impurities. Commercial sorbitan fatty acid ester surfactants form an undesirable water soluble sludge when these surfactants are dissolved in an oil phase. It has been found that polyols such as sorbitan and isosorbide are the main components of the sludge. The sludge must be removed before the surfactant in the oil phase is used to prepare an emulsion in order to prevent plugging of the mixing equipment. Thus, it is advantageous to reduce the sludge concentration in the oil phase containing sorbitan fatty acid ester surfactants.

The stability of the emulsion is directly tied to the surface activity of the emulsifier. A robust emulsifier will stabilize emulsions up to high (30:1) water:oil ratios. A poor emulsifier will not form stable emulsions, and at high water to oil ratios the emulsion will degrade by not incorporating water, and eventually break completely.

One method of enhancing the emulsifier is to combine different sorbitan fatty acid esters as reported in U.S. Pat. No. 5,200,433. However, it is desirable to further enhance the emulsion stability to obtain higher ratio water-in-oil emulsion increasing the overall absorption capacity.

Further, relatively large amounts of sorbitan fatty acid ester surfactants are required to prepare the high internal phase emulsions. To stabilize an emulsion consisting of 30 parts aqueous phase dispersed in 1 part oil phase by volume, a 10 percent by weight or greater concentration of sorbitan fatty acid ester surfactant in the oil phase is generally needed. The use of such a large amount of surfactant is undesirable since it increases the raw material cost of producing a foam. Thus, it is desirable to be able to form a stable emulsion with less surfactants.

Further, some sorbitan fatty acid ester surfactants, such as sorbitan monolaurate, are not effective emulsifiers at elevated temperatures. However, it is desirable to be able to use these surfactants to prepare high internal phase emulsions at elevated temperatures.

It is therefore an object of the present invention to provide a more effective surfactant system for the preparation of a high internal phase water-in-oil emulsion useful for preparing low density crosslinked polymeric materials.

DESCRIPTION OF THE INVENTION

According to the invention, a process for the production of a porous crosslinked polymeric material is provided, comprising the steps of:

(a) providing a water-in-oil emulsion comprising (i) a mixture of polymerizable monomers comprising at least one oil-soluble vinyl monomer and from about 2 to about 70 weight percent, based on the mixture, of at least one multifunctional unsaturated crosslinking monomer, (ii) at least 90 weight percent, based on the emulsion, of water as the internal phase (iii) a surfactant comprising (A) an anionic surfactant, the anionic surfactant having an oil soluble tail and an anionic functional group and (B) at least one quaternary salt having at least one hydrocarbon group having greater than or equal to 8 carbon atoms, and (iv) a polymerization initiator; and (b) heating the water-in-oil emulsion under conditions effective to polymerize and crosslink the polymerizable monomers. The curable high internal phase water-in-oil emulsion is also provided. A non-ionic surfactant such as a saccharide fatty acid ester or a sorbitan fatty acid ester (or a mixture thereof) may also be employed with the surfactant mixture of the present invention.

DETAILED DESCRIPTION OF THE PREFERRED EMBODIMENTS

It has been found that by adding a quaternary salt having at least one greater than or equal to 8 carbon atoms hydrocarbon group as a surfactant additive to the anionic surfactant in a curable high internal phase water-in-oil emulsion increases emulsion stability such that higher water to oil ratio emulsions are achievable with less surfactant concentration. These stable curable high internal phase water-in-oil emulsions are useful in forming low density porous crosslinked polymeric materials (hereinafter "foam"). These foams generally have a dry density of less than about 0.1 g/cc.

In one embodiment of the inventive process, a foam is produced by first forming a curable water-in-oil high internal phase emulsion by gradually adding and mixing an aqueous solution optionally containing an electrolyte into a monomer solution (oil phase) containing a mixture of polymerizable monomers and the surfactant mixture containing (a) an anionic surfactant and (b) one or more quaternary salts having one or more greater than or equal to $C_8$ hydrocarbon group directly or indirectly attached to the quaternary cation head group. A polymerization initiator is also added either in the monomer solution or the aqueous solution before mixing or after formation of the emulsion depending on the desired process conditions. The curable water-in-oil high internal phase emulsion is cured (polymerized and crosslinked) by heating the emulsion at a temperature of at least about 25° C. for a time effective to cure the monomers.

The mixture of polymerizable monomers generally contains one or more vinyl monomers and one or more crosslinking agents. Various monomers may be used in the preparation of the foams, provided the monomers can be dispersed in or form an oil phase of a water-in-oil high internal phase emulsion (oil-soluble) and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene, isoprene, and piperylene; allenes such as allene, methyl allene and chloroallene; olefin halides such as vinyl chloride, vinyl fluoride and polyfluoro-olefins; and mixtures thereof.

Suitable crosslinking agents can be any multifunctional unsaturated monomers capable of reacting with the vinyl monomers. The crosslinking agents contain at least two functional groups. The functional groups may be, for example, vinyl groups, acrylate groups and methacrylate groups. Multifunctional unsaturated crosslinking monomers include, for example, difunctional unsaturated crosslinking monomers such as divinyl benzene, diethylene glycol dimethacrylate, 1,3-butanediol dimethacrylate, and allyl methacrylate and tri-, tetra- and penta-functional unsaturated crosslinking monomers such as trimethylolpropane trimethacrylate, pentaerythritol tetramethacrylate, trimethylolpropane triacrylate, and pentaerythritol tetraacrylate, glucose pentaacrylate, glucose diethylmercaptal pentaacrylate, and sorbitan triacrylate; and poly-functional unsaturated crosslinking monomers such as polyacrylates (e.g. sucrose per(meth)acrylate and cellulose (meth)acrylate). Crosslinking monomers are typically present in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Suitable polymerization initiators can be water-soluble or oil-soluble. Water-soluble initiators include, for example, persulfates such as potassium or sodium persulfate and various redox systems such as ammonium persulfate together with sodium metabisulfite. Oil soluble (monomer soluble) initiators include, for example, azo compounds such as azobisisobutyronitrile (AIBN); and peroxides such as benzoyl peroxide, methyl ethyl ketone peroxide, alkylperoxydicarbonates such as di-2-ethylhexyl peroxydicarbonate and di(sec-butyl)peroxydicarbonate and alkylperoxycarboxylates such as t-butyl peroxyisobutyrate, 2,5-dimethyl-2,5-bis(2,3-ethylhexanoylperoxy)hexane, and t-butyl peroctoate. The preferred water-soluble polymerization initiator is potassium persulfate and the preferred oil-soluble polymerization initiators are alkylperoxycarbonates and alkylperoxycarboxylates for fast curing time.

Most preferable alkylperoxycarbonates are branched at the 1-carbon position and most preferable alkylperoxycarboxylates are branched at the α-carbon position and/or 1-carbon position. These branched alkylperoxycarbonate peroxide can be represented by the formula:

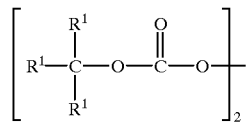

where $R^1$ is independently $C_1$ to $C_{16}$ hydrocarbons or hydrogen in which at least two of the $R^1$ are hydrocarbon groups.

The preferred branched alkyl carboxylate peroxide can be represented by the formula:

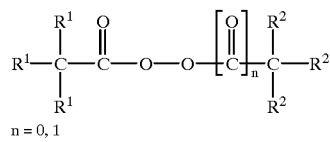

$n = 0, 1$ where $R^1$ and $R^2$ are independently $C_1$ to $C_{16}$ hydrocarbon groups or hydrogen in which at least two of the $R^1$ or $R^2$ are hydrocarbon groups. Preferably at least two of both $R^1$ and $R^2$ are hydrocarbon groups. Hydrocarbon groups can be alkyl, alkenyl or aryl groups.

The water-soluble initiators and/or oil-soluble initiators should be present in an effective amount to cure (polymerize and to crosslink) the monomers. Typically the initiator can be present from about 0.005 to about 15 weight percent based on the monomers. The initiators can be introduced with the oil phase or the aqueous phase before or after formation of the high internal phase emulsion.

A water-soluble initiator such as potassium persulfate can be added to the aqueous solution before forming the emulsion or to the emulsion. An oil-soluble initiator can be added to the monomer solution or an advanced monomer solution or to the emulsion. Addition of a polymerization initiator to an high internal phase water-in-oil emulsion is described in U.S. Pat. No. 5,210,104, the disclosure of which is herein incorporated by reference. The initiator added to the emulsion can optionally be blended into the emulsion by any blending technique such as, for example, static mixer or a pin mixer at a low shear rate, to form a curable water-in-oil high internal phase emulsion. The rate of shear must be high enough to blend the initiator but low enough not to allow the emulsion to coalesce or liquify.

Conveniently, the initiators can be added to the oil phase (monomer phase) or aqueous phase prior to formation of the emulsion.

The surfactant used in making the high internal phase emulsion which is to be polymerized is important in forming water-in-oil high internal phase emulsion and the final properties of the foams obtained. The surfactants are typically added to the monomer phase (oil phase). In the inventive process, the surfactant system contains component (a) an anionic surfactant and component (b) at least one quaternary salt having one or more greater than or equal to $C_8$ hydrocarbon groups, and optionally a saccharide fatty acid ester or a sorbitan fatty acid ester (or a mixture thereof).

Component (a) is an anionic surfactant having an oil soluble tail and at least one anionic functional group. The anionic functional group may be, for example, a sulfonic, sulfate, carboxylate, or phosphate group. This anionic surfactant may be a carboxylate, polyalkoxy carboxylate, alkylsulfonate, alkylarenesuflonate, lignosulfonate, naphthalenesulfonate, olefinsulfonate, petroleum sulfonate, sulfonate with ester, amide, or ether linkages, alcohol sulfates, ethoxylated sulfated alcohols, sulfated alkylphenols, ethoxylated sulfated alkyphenols, sulfated fatty acids, sulfated amides, sulfated esters, phosphate esters, and phosphate diesters. Each of these types of surfactants are well known and commercially available.

The component (a) is preferably an anionic sulfonated or carboxylated surfactant. These surfactants are of the formula:

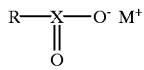

where R is an oil soluble hydrocarbon,

X is a carbon or S=O, and $M^+$ is selected from the group of hydrogen, metal ion, ammonium ion, and water soluble hydrocarbon group.

R is preferably an aromatic, and most preferably an aromatic with an alkyl side chain of six to twenty carbons. The side chain is preferably a side chain of about twelve carbons, either branched or linear, but branched is most preferred. R could also be an alkoxy group, an alky group, or an aromatic group, or a group containing two or more of these.

$M^+$ could be a metal ion, a hydrogen cation, an ammonium group, or a water soluble hydrocarbon. An example of an acceptable water soluble hydrocarbon a glycerol group. The ammonium group could be an ammonium alkyl that also serves as component (b). Dodecylbenzene and tridecylbenzene sulfonate salts are preferred, and dodecylbenzene sulfonate salts are particularally preferred. Commercially available dodecylbenzene and tridecyclbenzene sulfonate salts include: ALKASURF IPAM, ALKASURF LA ACID, ALKASURFT T, ARDET A-25, ARSUL, BIO-SOFT LAS-40S, BIO-SOFT N-300, BIO-SOFT N0411, CARSOFOAM® T 60L, ESI-TERGE T-60, HARTOFOL, HIPOCHEM NO. 40-L, MARANIL A, NAXEL AAS SPECIAL 3, NAXEL AAS 35S, NAXEL AAS 40S, NAXEL AAS 45S, NAXEL AAS 60S, NAXEL AAS 70S, NAXEL AAS 75S, NAXEL AAS 90F, NONASOL SNS-30, NORFOX LAS-99, NORFOX T-60, NORFOX 40, NORFOX 85, NORFOX 90, PENTINE 1185, POLYSTEP A-4, POLYSTEP A-7, POLYSTEP A-11, POLYSTEP A-15, POLYSTEP A-15-30K, POLYSTEP A-16, POLYSTEP A-17, PRIMASOL FP, SIPONATE DS, STEPANTAN DS-40, STEPANTAN DT-60, STEPANTAN HP-90, SUL-FON-ATE AA-10, SULFOTEX LAS-90, SULFOTEX UBL-100, TEX-WET 1197, UFARYL D, UFASSAN, VISTA C-500, WITCO® 97H, WITCONATE™ C-50H, WITCONATE™ P10-59, WITCONATE™ TDB, WITCONATE™ YLA, WITCONATE™ 45BX, WITCONATE™ 60B, WITCONATE™ 93S, and WITCONATE™ 1850.

The component (b) is a quaternary salt having one or more cation head groups and one or more hydrocarbon tail groups. The hydrocarbon tail group is preferably greater than or equal to $C_8$, preferably about $C_8$–$C_{30}$, more preferably about $C_{10}$–$C_{20}$ hydrocarbon group directly or indirectly attached to the quaternary cation head group. The quaternary cation head group can be any heteroatom-containing head group, particularly Group VA of the periodic table (CAS system), having positive charge such as ammonium and phosphonium ions. Preferably, the heteroatoms can be nitrogen or phosphorus atoms. The preferred quaternary salts can be represented by the general formula:

wherein R, the tail group, is a hydrocarbon having greater than or equal to 8 carbon atoms, preferably $C_8$–$C_{30}$, and Q is a cationic head group having a positive charge of x containing at least one heteroatom, x is greater than 0, preferably 1 or 2, y is an integer of 1 to 3, and Z is an anionic counter ion having a negative charge of x.

The term quaternary salts include compounds which have positive charges at the pH level of the emulsion medium. There may be more than one positive charge and the compound may have more than one head group. Nitrogen atom-containing quaternary salts include, for example, alkyl ammonium, alkyl pyridinium, alkyl isoquinolium, alkyl imidazolinium and alkyl imidazoline salts. Phosphorus atom containing quaternary salts include, for example, alkyl phosphonium salts and aryl phosphonium salts and aryl alkyl phosphonium salts. There can be one or more heteroatom in the head group. The quaternary salt may contain inert substituents such as ethoxylates and propoxylates. The counter ions can be any negatively charged group such as acetates, sulfates, nitrites, and halides such as chloride, bromide and iodides. The quaternary salt surfactant additives may or may not, by itself, emulsify the emulsion system of the invention.

The preferred alkyl ammonium salts can be represented by the general formula:

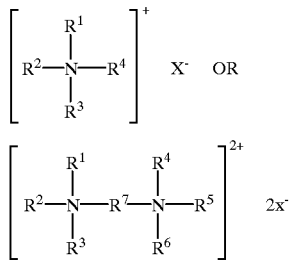

wherein $R^1$, $R^2$, $R^3$, $R^4$, $R^5$, and $R^6$ are independently a hydrocarbyl group such as alkyl, aryl, alkylaryl, arylalkyl and alkoxylates and provided one or more of $R^1$, $R^2$, $R^3$, $R^4$, $R^5$, and $R^6$ is a hydrocarbon group such as linear and/or branched alkyl, having at least 8 carbon atoms, preferably 10 to 30 carbon atoms, more preferably 14 to 20 carbon atoms as the tail group, preferably the hydrocarbyl group is a $C_1$ to $C_{30}$ hydrocarbyl group, and $R^7$ is a divalent hydrocarbyl group, and X is an anionic counter-ion.

The preferred alkyl pyridinium or isoquinolium salts can be represented by the general formula:

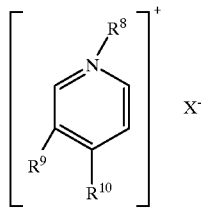

wherein $R^8$ is a hydrocarbon having at least 8 carbon atoms, preferably at least 8 carbon atoms to 30 carbon atoms, more preferably 12 to 22 carbon atoms as the tail group, $R^9$ and $R^{10}$ are hydrogen or together form a fused ring, X is an anionic counter ion described above.

The preferred alkyl imidazolinium and imidazoline salts can be represented by the general formula:

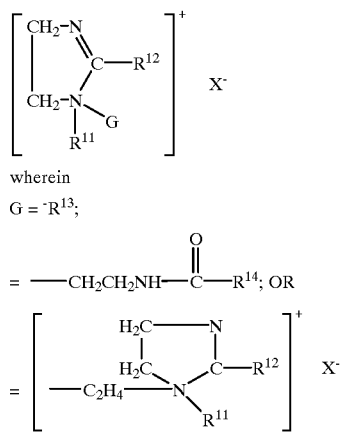

wherein

G = $^-R^{13}$;

= —CH$_2$CH$_2$NH—$\overset{\overset{O}{\|}}{C}$—R$^{14}$; OR

=

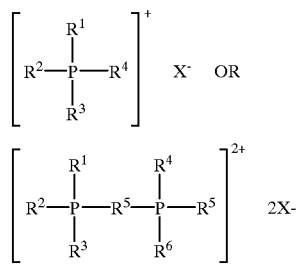

wherein $R^7$, $R^8$, $R^9$, and $R^{10}$ are independently a hydrocarbyl group such as alkyl, aryl, alkylaryl, arylalkyl and alkoxylates and provided one or more of $R^8$, $R^9$, and $R^{10}$, is a hydrocarbon group such as linear and/or branched alkyl, having at least 8 carbon atoms, preferably 10 to 30 carbon atoms, more preferably 14 to 20 carbon atoms as the tail group, preferably the hydrocarbyl group is a $C_1$ to $C_{30}$ hydrocarbyl group, and X is an anionic counter-ion.

The preferred alkyl phosphonium salts can be represented by the general formula:

$$\begin{bmatrix} & R^1 & \\ R^2 - & P - & R^4 \\ & R^3 & \end{bmatrix}^+ \quad X^- \quad OR$$

$$\begin{bmatrix} & R^1 & & R^4 & \\ R^2 - & P - & R^5 - & P - & R^5 \\ & R^3 & & R^6 & \end{bmatrix}^{2+} \quad 2X^-$$

wherein $R^1$, $R^2$, $R^3$, $R^4$, $R^5$, and $R^6$ are independently a hydrocarbyl group such as alkyl, aryl, alkylaryl, arylalkyl and alkoxylates and provided one or more of $R^1$, $R^2$, $R^3$, $R^4$, $R^5$, and $R^6$ is a hydrocarbon group such as linear and/or branched alkyl, having at least 8 carbon atoms, preferably 8 to 30 carbon atoms, more preferably 12 to 22 carbon atoms as the tail group, preferably the hydrocarbyl group is a $C_1$ to $C_{30}$ hydrocarbyl group, and $R^5$ is a divalent hydrocarbyl group, and X is an anionic counter ion described above.

Examples of the quaternary salts include alkylammonium salts such as cocoalkyltrimethylammonium chloride, soyaalkyltri-methylammonium chloride, tallow-alkyltrimethylammonium chloride, dodecyltrimethylammonium chloride, hexadecyltrimethyl ammonium chloride, octadecyltrimethylammonium chloride, 2-ethylhexyl-(hydrogenated tallow)alkyldimethylammonium methosulfate, didecyldimethylammonium chloride, dicocodimethylammonium nitrites, dicocoalkyldimethyl chlorides, ditallowalkyldimethyl chlorides, dihydrogenated tallowalkyldimethyl ammonium chloride, dioctadecyldimethyl chloride, trihexadecylmethylammonium chloride, cocoalkylmethyl [ethoxylated (2)] chloride, tallowalkyl-ethyoxylated (2) acetates, cocoalkylmethyl [ethoxylated (2)] nitrate, benzyldimethyl ($C_{12}$–$C_{18}$) alkylammonium chloride, benzyldimethylcocoalkyl ammonium chlorides, benzyldimethyl(hydrogenated tallow)alkyl ammonium chlorides, benzylmethyldi(hydrogenated tallow) alkylammonium chlorides, N-tallow pentamethyl propane diammonium dichloride; alkyl-pyridinium salts such as dodecyltrimethyl pyridinium chloride, cetylpyridinium chloride, bi(cetylpyridinium) dichloride, distearyl pyridinium chloride, lauryl pyridinium chloride and hexadecylpyridinium chloride; alkylisoquinolium salts such as lauryl isoquinolium bromide; and alkylphosphonium salts such as hexadecyl-tri-n-butylphosphonium bromide; and alkylimidazolinium salts such as methyl-1-hydro tallow amido ethyl-2-hydro tallow imidazolinium methylsulfate, and diethyl heptadecyl imidazolinium ethylsulfate; and alkylimidazolline salts.

Some specific examples of commercially available quaternary salts include, for example, alkyl ammonium salts such as VARIQUAT® quaternaries B345, 50 MC, 80 MC LC 80, 60 LC, E228, E290, K300, K375; VARISOFT® quaternaries SDC, ADOGEN quaternaries 415, 441, 444, 461, 471, R-6, 432, 434, 436, 442, 462, 470, 477, 137, and 464; AEROSURF® quaternaries TA-100 (from Sherex Chemical Co., Inc.); ARAQUAD® salts C-33W, C-50, S-50, T-27W, 12-50, 16-29W, 16-50, 18-50, HTL8(W) MS-85, 210-50, 2C-70 Nitrite, 2C-75, 2T-75, 2HT-75, 218-75, 218-100, 316(W), B-100, DMCB-80, DMHTB-75, M2HTB-80; DUOQUAD® salts T-50, O-50 (from Akzo); ETHOQUAD® salts C-12-75, C12 NO$_3$, C/12W, C/12B, C/25, O/12, 18/12, 18/25, T/12, T13-50 (from Akzo); ETHODUOQUAD® salts T/15-50; PROPOQUAD® salts 2HT/11 and T/12 and imidazilinium salts such as VARISOFT® quaternaries 445, 475, 3690, 6112 (from Sherex Chemical Co., Inc.); and commercially available alkylpyridinium salts.

The preferred sorbitan fatty acid esters include a fatty acid ester of a sorbitan having the formula $C_6(H_2O)_5H_2$. Preferably the sorbitan fatty acid esters have at least one fatty acid ester moiety having $C_8$ to $C_{30}$ hydrocarbyl segment, more preferably $C_{12}$ to $C_{20}$ hydrocarbyl segment. These hydrocarbyl segments can be alkyl (straight or branched), aryl, cyclic or arylalkyl. The fatty acid esters can contain other inert substituents. The preferred sorbitan fatty acid esters include, for example, sorbitan monooleate, sorbitan monolaurate, sorbitan monopalmitate, sorbitan trioleate, sorbitan monostearate and sorbitan tristearate. Commercially available sorbitan fatty acid ester surfactants include, for example, SPAN® emulsifying agents 20, 40, 60, 65, 80 and 85 (from Fluka Chemical Corp. or Aldrich Chemical Co.), EMSORB 2502 (from Henkel) and ALKAMULS® sorbitan esters SML, SMO, SMS, STO (from Alkaril Chemicals Ltd.) among others. A combination of sorbitan esters such as a combination of SPAN® 20 and 40 emulsifying agents can also be used. In particular when a hydrophilic foam is desired, one or more sorbitan fatty acid ester is preferred.

The saccharide fatty acid ester surfactant can be monosaccharides or oligosaccharides. Monosaccharides are polyhydroxy aldehydes or ketones having the general chemical formula $C_n(H_2O)_n$ where n is 3, 4, 5, 6, 7, 8, 9 or 10, and preferably 5 or 6. Examples of monosaccharides where n is 6 are D-glucose, D-fructose, D-mannose and D-galactose. Oligosaccharides are combinations of two or more saccharides joined by O-glucoside linkages having the general chemical formula $C_m(H_2O)_{m-r}$ where m is an integer from 6 to 40 and r is the number of O-glucoside linkages (or number of monosaccharide molecules that form the oligosaccharide minus one). Examples of commonly occurring disaccharides are sucrose (D-glucose plus D-fructose), lactose (D-galactose plus D-glucose), and maltose (D-glucose plus D-glucose). Each of these molecules have the general chemical formula $C_{12}(H_2O)_{11}$. Raffinose is an example of a commonly occurring trisaccharide (D-glucose plus D-fructose plus D-galactose) and has the chemical formula $C_{18}(H_2O)_{16}$.

Monosaccharides and oligosaccharides can be partially esterified with fatty acids to obtain the saccharide fatty acid esters. One method to esterifying saccharides is by transesterification between the saccharide and an ester, whereby an acyl group is transferred to saccharide in the presence of a basic catalyst, e.g., potassium carbonate. For a typical saccharide, esterification with fatty acid esters preferably occurs at the methyl hydroxy side chain groups and the saccharide fatty acid esters produced can contain a mixture of esters. For example, sucrose fatty acid esters can contain a mixture of the mono-, di-, tri- esters.

The preferred saccharide fatty acid ester is a fatty acid ester of a saccharide having the formula $C_n(H_2O)_{n-r}$, wherein r is an integer from 0 to 3 and $3(r+1) \leq n \leq 10(r+1)$ (n is an integer from 3 to 40, more preferably from 3 to 32). More preferably the saccharide segment of the surfactant is a monosaccharide (r=0), disaccharide (r=1), trisaccharide (r=2). Preferably the saccharide fatty acid esters have at least one fatty acid ester moiety having $C_8$ to $C_{30}$ hydrocarbyl segment, more preferably $C_{12}$ to $C_{20}$ hydrocarbyl segment. These hydrocarbyl segments can be alkyl (straight or branched), aryl, cyclic or arylalkyl. The fatty acid esters can contain other inert substituents. Preferred monosaccharide and oligosaccharide fatty acid ester surfactants for preparing high internal phase, water-in-oil emulsions have ester values within the range of about 100 to about 250 mg KOH/g and hydroxyl values are within the range of about 100 to about 500 mg KOH/g. Foams containing saccharide fatty acid ester surfactants are generally hydrophobic.

Some specific examples of commercially available saccharide fatty acid ester surfactants are Crodesta F-50 emulsifying agent (sucrose distearate from Croda Inc.) and Crodesta F-110 emulsifying agent (sucrose mono-,di-stearate from Croda Inc.). Some other suitable fatty acid esters are sucrose dilaurate, sucrose dioleate, sucrose dipalmitate, fructose monopalmitate, fructose dipalmitate, glucose monodecanoate, glucose monooctanoate, glucose dioctanoate, lactose dilaurate, maltose monolaurate, maltose dilaurate, mannose monodecanoate, mannose didecancate, arabitol fatty acid esters, mannitol fatty acid esters, xylitol fatty acid esters, erythritol monooleate, mannitol monolaurate, and xylitol dioleate.

Partially alkylated derivatives of the above mentioned monosaccharide and oligosaccharide fatty acid ester surfactants can also be used and are included in the definition of saccharide fatty acid ester surfactants. In the alkylated derivatives, the hydroxyl positions of the monosaccharide or oligosaccharide fatty acid ester is partially alkylated with a lower alkyl group, preferably $C_{1-6}$, more preferably $C_{1-3}$, and most preferably $C_1$ alkyl group (i.e., methylated). For example, the methylated derivatives are methylated in the hydroxyl positions of the saccharides. These alkyl saccharide fatty acid esters can be used as mixtures with non-alkylated saccharide fatty acid esters or with sorbitan fatty acid esters. These alkyl saccharide fatty acid esters (or saccharide ether fatty acid esters) are known, for example, in Japanese patent specification 04016194-A and Adelhorst, K. et al., *Synthesis*, (2), 112–15 (1990). Some specific examples of commercially available surfactants are Glucate® SS (methyl glucose sesquistearate from Amerchol Corp.), Glucate® DO (methyl glucose dioleate from Amerchol Corp.), Grillocose PS (methyl glucose stearate from R.I.T.A. Corp.) and Grillocose IS (methyl glucose isostearate from R.I.T.A. Corp.) emulsifying agents. Some other preferred alkyl saccharide fatty acid esters include ethyl glucopyranoside didodecanoate, ethyl glucopyranoside dioctadecanoate, ethyl galactopyranosyl glucopyranoside didodecanoate, ethyl galactopyranosyl glucopyranoside monododecanoate, methyl mannoside didodecanoate.

The amount of surfactant system must be such that a water-in-oil high internal phase emulsion will form. Generally, the surfactant system is present in an amount effective to form a water-in-oil high internal phase emulsion (HIPE). Preferably, the surfactant system can be present from about 0.1 to about 40 weight percent, more preferably about 0.1 to about 25 weight percent based on the monomers. When saccharide fatty acid esters are used as component (a), the saccharide fatty acid surfactants are preferably present from about 0.1 weight percent to about 36 weight percent, more preferably from about 0.1 to about 25 weight percent based on the monomers.

The ratio of surfactant component (a) to surfactant component (b) is preferably within the range of from about 10:1 to about 1:10, preferably from about 3:1 to about 1:3. When a non-emulsifying surfactant is used as component (b), the ratio of (a) to (b) is preferably within the range of from about 10:1 to about 5:1. For emulsifying surfactant component (b), larger amount of component (b) can be used and in some cases preferable depending on the desired foam properties. A surfactant is non-emulsifying when the surfactant does not form a water-in-oil high internal phase emulsion of at least 30:1 water to oil ratio by itself as a surfactant. Examples of non-emulsifying co-surfactants include, for example, dodecyltrimethyl ammonium chloride.

In an especially preferred embodiment for low surfactant required, a molar ratio of 1:1 of anionic to cationic surfactant may be used. For example, sodium dodecylbenzene sulfonate may be combined with Adogen 444 in the monomer mixture, followed by removal of the precipitated sodium chloride and use of the anionic/cationic surfactant salt.

The relative amounts of the aqueous phase containing water and an electrolyte and monomer phase containing monomer mixtures and surfactants used to form the high internal phase emulsions are a factor in determining the structural, mechanical and performance properties of the resulting polymeric foams. The ratio of water and oil in the emulsion can influence the density, cell size, and specific surface area of the foam products. To form a polymeric foam product with suitable density and high absorption capacity, the water-in-oil high internal phase emulsion (HIPE) typically contains as the internal phase, at least about 90 weight percent, based on the emulsion, of water, corresponding to a water to oil weight ratio of at least about 9:1, more preferably at least about 95 weight percent of water, most preferably at least about 97 weight percent of water, corresponding to a water to oil weight ratio of at least about 33:1.

The internal aqueous phase can preferably contains a water-soluble electrolyte to stabilize the HIPE and to make the foam more water wettable. Suitable electrolytes include inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of a water-in-oil high internal phase emulsion is dependent on a number of factors such as the monomers used, water to oil ratio, type and amount of surfactant used, mixing conditions, presence and the amount of water-soluble electrolyte. Unless all of these factors are such that formation of a water-in-oil emulsion is favored, the emulsion will form a oil-in-water emulsion rather than water-in-oil high internal phase emulsion. It has been found that by adding the quaternary salt to a surfactant such as the anionic surfactants that satisfy the requirements of component (b), a more stable emulsion can be formed and higher water to oil ratio can be achieved resulting in higher fluid absorption capacity foams.

The formation of a water-in-oil emulsion is described in U.S. Pat. No. 4,522,953, the disclosure of which is herein incorporated by reference. In general, to form the water-in-oil emulsion, the water can be mixed in any way up to a water to oil ratio of about 4:1. An oil-in-water emulsion becomes preferred if the water was added all at once beyond a water to oil ratio of about 4:1. Typically, the water must be added gradually with a moderate rate of shear. A small capacity mixer such as a paint mixer with a shear rate of at least about 5 $s^{-1}$, preferably at least about 10 $s^{-1}$ can be used to mix the water-in-oil emulsion. A larger mixer equipped with an impeller with a shear rate of at least about 10 $s^{-1}$ or a pin gap mixer with a shear rate of at least about 50 $s_{-1}$, preferably at least about 100 $s^{-1}$ can also be used. If the shear rate is too low, the water-in-oil emulsion will revert to a oil-in-water emulsion. It is desirable to at least have a water to oil ratio of about 4:1, preferably at least about 19:1, more preferably at least about 30:1 for a high absorbency capacity foam.

An HIPE can be prepared in batches or continuously. To form an HIPE in batches, the emulsion is formed in a vessel or a container by gradually adding an aqueous phase to a monomer mixture under a moderate rate of shear until the desired water to oil ratio is reached.

An HIPE can be prepared continuously by initially preparing a preformed emulsion of approximately the same character as the desired emulsion by the method described above, then introducing into the preformed emulsion, both the aqueous phase and the monomer phases in such proportions so as to produce the desired emulsion. The emulsified mass is maintained in a state of continuous shear sufficient to reduce the effective viscosity of the mass near to that of the introduced phase but not above the inherent shear stability point of the desired emulsion, and then withdrawing the prepared emulsion at the desired rate.

The aqueous phase and the monomer phase for batch process and continuous process can be introduced in a mixing vessel by an aqueous stream or a monomer stream, respectively, through one or more inlets. The streams can be combined prior to or after entering the mixing vessel then mixed in such a way to produce the desired HIPE. The mixing vessel is any container in which the high internal phase emulsion is made regardless of the type of mixer or mixer head used.

The curable water-in-oil high internal phase emulsions (curable HIPE) can be cured in a batch process or in a continuous process. The emulsion or aqueous stream or monomer stream can be heated prior to or after the addition of the initiator.

In a batch process, the curable HIPE is collected in a suitable container with the desirable shape and cured at a temperature at least about 25° C. for a time effective to polymerize and to cure the monomers. The HIPE is preferably polymerized and cured at a temperature within the range of about 25° C. to about 90° C., as long as the emulsion is stable at the curing temperature. Alternatively, a multiple-step process as described in a U.S. Pat. No. 5,189,070, issued Feb. 23, 1993, can also be used, the disclosure of which is herein incorporated by reference. In the multi-step process the emulsion is pre-cured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure can be as high as about 175° C. under suitable pressure to prevent water from boiling.

The emulsions can be heated, for example, by hot water, hot air, steam, IR, RF, microwave or ohmic heating. The HIPE should be cured until the desired properties are obtained. Typically, to obtain a cured foam, the HIPE should be cured for at least about 8 hours, at 60° C. or at least about 1 hour at 60° C. then 3 hours at a temperature of above about 70° C. Generally, the extent of reaction after curing is at least about 85% of the monomers, preferably at least about 90%, more preferably at least about 95% (i.e., less than about 5% of free monomers), most preferably at least about 99% (i.e., less than about 1% of free monomers) in order to obtain good properties.

These foams can be optionally post-cured to improve the foam properties. Post-curing of the foam can be carried out by heating the foams at a temperature of above about 75° C., preferably greater than 90° C. by steam, hot air or other heating source. Such heating may be performed initially in a heat exchanger, oven, over heated rollers or by other means.

When the temperature is near or above the boiling point of water, pressure is preferably applied to keep the water in the liquid phase. Pressure can be applied to the emulsion, if desired, at a pressure generally from above atmospheric pressure, typically within the range of about atmospheric pressure to about 1.03 MPa (150 psig). When the temperature is about 100° C., a pressure from about 7 to 70 kPa gauge (about 1 to 10 psig) is sufficient; when the temperature is about 130° C., a pressure from about 210 to 480 kPa gauge (about 30 psig to 70 psig) is preferred. The preferred pressures will be from just above the autogenous steam pressure of the solution to about twice that pressure (on an absolute pressure basis).

For example, the emulsion can be cured under pressure by using an autoclave operating under autogenous pressure of steam generated from pure water at a given temperature, by applying nitrogen or air pressure to prevent boiling of the emulsion or by mechanical means, such as rollers, pistons, molds, or the like.

Once the curing and/or post-curing process is completed, the water incorporated in the foam may be removed or squeezed out, dried by heat or flashed by lowering the pressure to a suitable level to evaporate the remaining liquid to give the desired degree of dryness in the product foam. These drying techniques will preferably be used after the desired state of cure is developed in the foam material.

These foams prepared by the inventive process may be washed prior to, after or between drying stages (removing at least a portion of the water) to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

The foams produced by the inventive process possess high absorption capacities and good uniform properties especially suitable for use as liquid absorbent articles such as wipes, diapers and catamenial products for example.

Illustrative Embodiment

The following illustrative embodiments describe the process of the invention and are provided for illustrative purposes and are not meant as limiting the invention.

The surfactants utilized were SPAN® 20 (sorbitan monolaurate) emulsifying agent from Fluka Chemical Corporation, Aldrich Chemical Company or Imperial Chemical Industries; ADOGEN® 444 (trimethyl cetyl quaternary ammonium chloride) from Sherex Chemical Co., Inc.; VARIQUAT B347 (dimethyl alkyl ($C_{14}$–$C_{18}$) benzyl ammonium chloride) from Sherex Chemical Co., Inc.; VARISOFT 475 (methyl-1-tallow amido ethyl-2-tallow imidazolinium-methyl sulfate) from Sherex Chemical Co., Inc.; MIRAMINE OC (inideazoline of oleic acid) from Venture Ltd. Chemical Products; WITCAMIDE 511 (oleic diethanol amide) from Witco Chemical Ltd.; ALDO® MSLG (glycerol monosterate) from Aldo Products Co. Inc.; and a dodecylbenzene sulfonate sodium salt "DDBSS". A commercial divinyl benzene containing 55% divinyl benzene from Aldrich Chemical Company was used. The quantity of monomer phase made in one batch was between 1–3 liters.

Examples 1–15 demonstrate the process of the invention using a quaternary salt surfactants with the anionic surfactants.

Washing and Drying Method

The following washing and drying method was used for all of the examples below: After the foam blocks were cured, the blocks were sliced to 0.35 inches (0.89 cm) thickness. Then, each individual slice was placed on a 0.04 inch (0.1 cm) mesh screen between a 9"×6.75" (22.9 cm×17.1 cm) stainless steel plate that allowed the slice to be squeezed to a 0.045 inch (1.14 mm) thickness. The squeezed slices were placed in an Arbor-press made by DAKE and the calcium chloride solution was squeezed out. The slices were then washed and squeezed twice by soaking the slices in 7.6 liters (2 US gallons) of 1% calcium chloride solution and placing in the Arbor-press. Then, after the slices were squeezed, a paper towel was placed on both sides of the washed slices which were squeezed again to remove excess water from the slices. The slices were then placed in an oven at a temperature of 60° C. for 4 hours to dry. The washed and dried foam slices were analyzed for physical properties as discussed below.

TESTING METHODS

Free Swell ("FS")/Percent Recovery/Foam Density ("FD")/Percent Strain/Resistance to Compression Deflection ("RTCD")/Swell Ratio:

A 2"×2" (5.08×5.08 cm) square is cut from a foam slice. The thickness of the foam sample is measured while it is dry ("dry thickness") using a dead weight thickness gage (a digital linear gage model EG-225 made by Ono Sokki) exerting 50 grams force applied to a 1.60" diameter disk. This thickness is called the "caliper." The foam square is soaked in warm 88° F. (31° C.) Syn-Urine from Jayco for 17 minutes. From the 2"×2" (5.08×5.08 cm) square, a circle of 1.129" (2.868 cm) diameter is cut. This disk is re-equilibrated in the Syn-Urine for 5 minutes. The wet disk is then weighed ("initial wet weight").

The thickness of the wet sample is measured using the same load gage ("initial wet caliper"). The disk is then placed under a 0.74 psi stress where stress is the total dead weight applied to the gage divided by the cross-sectional area. The thickness of the disk is measured under this stress after 15 minutes ("wet caliper"). After 15 minutes, the specimen disk is weighed to measure the retained fluid.

The excess urine is squeezed from the disk and the remainder of the square from which it was cut. The foam is placed in boiling deionized water for 15 minutes. The foam is washed this way several times to remove inorganics. The foam is then removed, blotted dry, then placed in a vacuum oven at 60–70° C. and dried until the foam has fully expanded. The weight of the dry disk sample is then determined in grams ("final dry weight").

The following values were calculated from the above measurements.

Free swell=initial wet weight/final dry weight

Resistance to Compression Deflection ("RTCD")=wet weight after load at 15 minutes/final dry weight Swell Ratio=RTCD/Free swell×100

$$\% \text{ Strain} = \frac{\text{initial wet caliper} - \text{wet caliper}}{\text{initial wet caliper}} \times 100$$

Foam Volume ($cm^3$)=(diameter/2)$^2$×3.142×initial wet caliper based on a 1.129" diameter circle cut (in cm)

Foam Density ($mg/cm^3$)=final dry weight×1000/Foam Volume % Recovery=dry thickness/initial wet caliper×100

Vertical Wicking Rate ("VWR"):

From a foam slice, cut at 0.35 inches (0.89 cm) thickness, a 1 to 2 cm wide strip is cut, greater than 5 cm in length. The strip of foam is clamped or taped to a metal ruler, with the bottom of the foam strip flush with the 0 mark on the ruler. The ruler and foam are placed in a container of approximately 100 ml Syn-Urine from Jayco, in an incubator at 99° F. (37° C.) so the bottom of the strip (0 mark) is barely touching the surface of the Syn-Urine (less than 1 mm). The Syn-Urine is dyed with food coloring to more easily monitor its absorption and rise in the foam. A stopwatch is used to measure the time required for the liquid level to reach 5 cm vertical height in the foam sample.

Percent Free Liquid:

The amount of unabsorbed water was measured by decanting fluid from the foam in the container after pre-curing or curing stage and weighing the decanted fluid.

EXAMPLES 1–15

For each example, a solution of about 10% wt calcium chloride and 0.15% wt potassium persulfate in water was added to a beaker containing a monomer and surfactant mixture while being mixed with a air driven paint stirrer. The monomer solution was 20% wt styrene, 20% wt divinyl benzene, and 60% wt 2-ethyl hexyl acrylate, except for example 10, which was 10% wt styrene, 40% wt divinyl benzene and 50% wt 2-ethyl hexyl acrylate. Additionally, for example 15, about 1.1% wt, based on the monomers present, was added after the emulsion was formed, and then stirring with the paint stirrer was continued for two more minutes. The emulsions were formed at a temperature of 40° C. The emulsions were then placed in plastic containers and covered with a lid, and placed in an oven to cure. Table 1 includes the water to monomer weight ratio, amounts and types of surfactants (in weight percents based on the monomers), cure temperature, cure time, and percent free water after the cure. Cured foams were then rinsed and dried as described above, and percent strain ("strain"), percent strain to compression deflection ("RTCD"), foam density ("FD"), free swell ("FS"), and vertical wicking rate "(VWR") were determined as described above. Foam properties are listed in Table 2 below.

TABLE 1

| Example No. | Water to Oil Ratio | Surfactant wt % based on monomers | Cure Temp. °C. | Cure Time hours | Free Water (%) |
|---|---|---|---|---|---|
| 1 | 30/1 | 5.8 WITCAMIDE 511<br>5.8 DDBSS | 60 | 69 | 4.3 |
| 2 | 30/1 | 5.8 WITCAMIDE 511<br>5.8 DDBSS | 126 | 4 | 0.0 |
| 3 | 60/1 | 0.64 MIRAMINE OC<br>1.3 ADOGEN 444<br>0.64 DDBSS | 60 | 22 | 4.9 |
| 4 | 30/1 | 4.5 MIRAMINE OC<br>1.5 DDBSS | 60 | 24 | 24.2 |
| 5 | 30/1 | 1.0 ADOGEN 444<br>1.0 DDBSS | 60 | 22 | 4.0 |
| 6 | 50/1 | 1.0 ADOGEN 444<br>1.0 DDBSS | 60 | 22 | 13.9 |
| 7 | 30/1 | 6.0 VARIQUAT B345<br>3.0 DDBSS | 60 | 22 | 12.0 |
| 8 | 30/1 | 3.2 VARISOFT 475<br>3.2 ALDO MSLG | 60 | 22 | 0.8 |
| 9 | 50/1 | 1.5 VARISOFT 475<br>1.5 ALDO MSLG | 60 | 22 | 32.7 |
| 10 | 60/1 | 12.6 SPAN 20<br>1.0 ADOGEN 444<br>1.0 DDBSS | 60 | 23 | 1.64 |
| 11 | 30/1 | 1.0 ADOGEN 444<br>1.0 DDBSS | 115 | 4 | 0.0 |
| 12 | 30/1 | 3.0 ADOGEN 444<br>3.0 DDBSSS | 125 | 4 | 0.0 |
| 13 | 30/1 | 2.0 SPAN 20<br>0.5 ADOGEN 444<br>0.6 DDBSSS | 60 | 26 | 13.0 |
| 14 | 30/1 | 6.3 SPAN 20<br>0.4 ADOGEN 444<br>0.3 DDBSS | 100 | 17 | 0.0 |
| 15 | 30/1 | 6.3 SPAN 20<br>2.0 ADOGEN 444<br>2.0 DDBSS | 100 | 1.25 | 8.0 |

TABLE 2

FOAM PROPERTIES

| Example | Strain % | RTCD g/g | FD mg/cm$^3$ | FS g/g | VWR sec. |
|---|---|---|---|---|---|
| 1 | 58.2 | 13.9 | 26.2 | 28.6 | 54.0 |
| 2 | 53.2 | 13.9 | 29.5 | 30.1 | 170.0 |
| 3 | 73.4 | 13.5 | 17.2 | 44.5 | 50.0 |
| 4 | 28.9 | 16.0 | 32.3 | 22.8 | 73.0 |
| 5 | 15.5 | 2.31 | 31.7 | 24.7 | 187.0 |
| 6 | 35.5 | 30.3 | 20.1 | 38.6 | 294.0 |
| 7 | 25.6 | 16.7 | 31.2 | 21.3 | 63.0 |
| 8 | 51.4 | 28.7 | 32.4 | 28.7 | >600.0 |
| 9 | 67.4 | 6.1 | 30.6 | 9.7 | >600.0 |
| 10 | 58.4 | 27.0 | 15.4 | 53.7 | 96.0 |
| 11 | 34.1 | 15.0 | 31.2 | 22.8 | 65.8 |
| 12 | 52.3 | 9.0 | 33.9 | 19.7 | 105.0 |
| 13 | 11.8 | 14.7 | 37.2 | 16.5 | 49.0 |
| 14 | 42.6 | 22.9 | 27.7 | 29.4 | >600.0 |
| 15 | 65.0 | 10.4 | * | 28.6 | 335.0 |

*Data not available.

Examples 2, 11, 12, 14 and 15 show that the emulsion was stable for a time period sufficient for curing at a temperatures of 100° C. to 126° C. For comparison, an otherwise similar emulsion with 12% wt (based on the monomers) of SPAN 20 instead of the surfactants of the present invention breaks quickly, and will not cure to a foam if heated to 126° C. The significance of enablement of higher temperature cures is that the cure can be accomplished with significantly less residence time at the curing temperature. An otherwise similar emulsion with 12% wt (based on the monomers) of SPAN 20 would require about 16 to 24 hours to cure at 60° C.

Examples other than 1, 2, 10, and 15 each demonstrate that stable emulsions are formed with significantly less than 10% wt surfactants in the mixtures. For comparison, about 12% wt surfactant is required when SPAN 20 is used under similar conditions. The surfactant is a significant portion of the costs of the resultant foam, and significant reductions in the amount of surfactant required is therefore a significant benefit.

Examples 3, 6, 9, and 10 each were prepared with a water to oil ratio of either 50 or 60. For comparison, with about 12% wt SPAN® 20 surfactant, only about a 40 water to oil ration is achievable. A higher water to oil ratio results in a less dense foam, and therefore less monomers and surfactants are needed to produce the volume of foam, and generally, a greater amount of fluids can be absorbed by the foam.

These examples therefore demonstrate significant and unexpected results from the use of the surfactant mixture of the present invention. The use of the combination of cationic and anionic surfactants of the present invention allows high temperature rapid cure without the emulsion breaking, results in improved foam properties, and dramatically reduced surfactant requirements.

What is claimed is:

1. A process for the production of a porous crosslinked polymeric material comprising:

(a) providing a water-in-oil emulsion comprising (i) a mixture of polymerizable monomers comprising at least one oil-soluble vinyl monomer and from about 2 to about 70 weight percent, based on the mixture, of a multifunctional unsaturated crosslinking monomer, (ii) at least 90 weight percent, based on the emulsion, of water as the internal phase (iii) an effective amount to produce the water-in-oil emulsion of a surfactant comprising (A) an anionic surfactant, the anionic surfactant having an oil soluble tail and an anionic functional group and (B) at least one quaternary salt having at least one hydrocarbon group having greater than or equal to 8 carbon atoms, and (iv) a polymerization initiator;

(b) curing said polymerizable monomers under conditions effective to polymerize and crosslink the polymerizable monomers; and (c) removing at least a portion of water from said crosslinked emulsion thereby producing a porous crosslinked polymeric material.

2. The process of claim 1 wherein the quaternary salt is a quaternary salt having at least one $C_8$–$C_{30}$ hydrocarbon group.

3. The process of claim 2 wherein the quaternary salt is a quaternary salt having one or more phosphorus or nitrogen atom-containing head groups.

4. The process of claim 1 wherein the quaternary salt can be represented by a formula:

wherein R is a hydrocarbon having greater than or equal to 8 carbon atoms, Q is a cationic head group having a positive charge of x and having at least one heteroatom, x is greater than 0, y is an integer of 1 to 3, and Z is an anionic counter ion having a negative charge of x.

5. The process of claim 4 wherein the ratio of component (iii) (A) to component (iii) (B) is within the range of from about 10:1 to about 1:10.

6. The process of claim 5 wherein the anionic surfactant is selected from the group consisting of sulfonate, sulfate, carboxylate, and phosphate functional group containing anionic surfactants.

7. The process of claim 5 wherein the amount of surfactants present in the emulsion is between about 2 and about 12 weight percent based on the polymerizable monomers.

8. The process of claim 6 wherein the emulsion further comprises a nonionic surfactant selected from the group consisting of sorbitan fatty acid ester, saccharide fatty acid ester and mixtures thereof.

9. The process of claim 1 wherein the anionic surfactant comprises a surfactant selected from the group comprising alkylarylsulfonates and fatty acid esters.

10. The process of claim 9 wherein the component (iii) (A) is present in an amount from about 1 to about 6 weight percent based on the polymerizable monomers.

11. The process of claim 7 wherein the emulsion comprises at least one saccharide fatty acid ester.

12. The process of claim 11 wherein the saccharide fatty acid ester is a fatty acid ester of a saccharide having the formula $C_n(H_2O)_{n-r}$, wherein r is an integer from 0 to 3 and $3(r+1)<n<10(r+1)$.

13. The process of claim 12 in which the saccharide fatty acid ester is partially alkylated in the hydroxyl positions of the saccharides.

14. The process of claim 3 in which the vinyl monomer is selected from the group consisting of monoalkenyl arenes, acrylate or methacrylate esters, conjugated diolefins, allenes, olefin halides and mixtures thereof.

15. The process of claim 14 in which the multifunctional unsaturated crosslinking monomer is a monomer having at least two functional groups, the functional groups selected from the group consisting of vinyl groups, acrylate groups, methacrylate groups, and mixtures thereof.

16. The process of claim 15 in which the water-in-oil emulsion comprises as the internal phase, at least about 90 weight percent, based on the emulsion, of water.

17. A curable water-in-oil emulsion composition comprising:

(a) a mixture of polymerizable monomers comprising at least one vinyl monomer and from about 2 to about 70 weight percent, based on the mixture, of a multifunctional unsaturated crosslinking monomer;

(b) at least 90 weight percent, based on the emulsion, of water as the internal phase;

(c) an effective amount of a surfactant to produce an water-in-oil emulsion comprising (i) an anionic surfactant, the anionic surfactant having an oil soluble tail and an anionic functional group and (ii) one or more quaternary salts having one or more hydrocarbon groups having greater than or equal to 8 carbon atoms, and (d) an effective amount of a polymerization initiator to polymerize and crosslink the polymerizable monomers.

18. The composition of claim 17 wherein the one or more quaternary salts have one or more $C_8$–$C_{30}$ hydrocarbon groups.

19. The composition of claim 18 wherein the one or more quaternary salts is a quaternary salt having one or more nitrogen or phosphorus atom containing head group.

20. The composition of claim 19 wherein the quaternary salt can be represented by a formula:

wherein R is a hydrocarbon having greater than or equal to 8 carbon atoms, Q is a cationic head group having a positive charge of x and having at least one heteroatom, x is greater than 0, y is an integer of 1 to 3, and Z is an anionic counter ion having a negative charge of x.

21. The composition of claim 20 wherein the ratio of component (C) (i) to component (C) (ii) is within the range of from about 1:10 to about 10:1.

22. The composition of claim 20 wherein the anionic surfactant is selected from the group consisting of sulfonate, sulfate, carboxylate, and phosphate functional group containing anionic surfactants.

23. The composition of claim 17 wherein the anionic surfactant is an alkyl benzene sulfonate and the quaternary salt has one or more hydrocarbon group having 12 to 20 carbon atoms.

* * * * *